United States Patent [19]

Murai et al.

[11] Patent Number: 4,839,321

[45] Date of Patent: Jun. 13, 1989

[54] SOLID CATALYST COMPONENT FOR OLEFIN POLYMERIZATION CATALYSTS

[75] Inventors: Atsushi Murai; Minoru Terano; Kohei Kimura; Masuo Inoue, all of Kanagawa, Japan

[73] Assignee: Toho Titanium Co., Ltd., Tokyo, Japan

[21] Appl. No.: 141,523

[22] Filed: Jan. 7, 1988

[30] Foreign Application Priority Data

Jan. 7, 1987 [JP] Japan .................................. 62-462

[51] Int. Cl.$^4$ .............................................. C08F 4/64
[52] U.S. Cl. ..................................... 502/127; 502/105; 502/129; 502/133; 526/125
[58] Field of Search ................. 502/127, 129, 133, 105

[56] References Cited

U.S. PATENT DOCUMENTS

| | | | |
|---|---|---|---|
| 4,328,122 | 5/1982 | Monte et al. | 502/127 |
| 4,414,132 | 11/1983 | Goodall et al. | 502/127 X |
| 4,547,476 | 10/1985 | Terano et al. | 502/133 X |
| 4,678,768 | 7/1987 | Fujita et al. | 502/129 X |
| 4,686,200 | 8/1987 | Terano et al. | 502/127 X |

*Primary Examiner*—Patrick P. Garvin
*Attorney, Agent, or Firm*—Birch, Stewart, Kolasch & Birch

[57] ABSTRACT

A solid catalyst component for olefin polymerization catalysts prepared by subjecting diethoxymagnesium (a), calcium chloride (b) and a silicon compound (c) of the general formula: $Si(OR)_4$ (wherein R is an alkyl or aryl group) together to a contact treatment in the presence of an organic solvent (d), suspending the treated composition in an aromatic hydrocarbon (e) which is liquid at normal temperature and bringing the suspension into a first contact with titanium tetrachloride (f) to form a product and bringing it to a second contact with titanium tetrachloride (f) in such manner that a diester (g) of an aromatic dicarboxylic acid is allowed to coexist at any stage of the above suspending and/or contacts with the exception of the contact treatment, the calcium chloride (b) being used in an amount of 1-2 g per gram of the diethoxymagnesium (a). This solid catalyst component exhibits, when applied to the polymerization of olefins, a surprisingly enhanced polymerization activity per titanium atom and a high stereospecific performance and scarcely necessitates any deashing treatment, thus affording a great economical advantage.

26 Claims, No Drawings

SOLID CATALYST COMPONENT FOR OLEFIN POLYMERIZATION CATALYSTS

BACKGROUND OF THE INVENTION

1. Field of the Invention:

The present invention relates to a high performance solid catalyst component for olefin polymerization catalysts. More particularly, the present invention relates to a new type solid catalyst component capable of exhibiting, when applied to the polymerization of olefins, a high polymerization activity combined with a high stereospecific performance, especially a surprisingly enhanced polymerization activity per titanium atom contained therein.

2. Description of the Prior Art:

From the past, various kinds of olefin polymerization catalysts have been known and widely utilized which are derived from a solid catalyst component comprising a titanium halide and an organoaluminum compound and possess a high catalytic activity. According to these olefin polymerization catalysts, however, the yield of olefin polymers per catalyst component or per titanium atom contained therein does not reach a satisfactorily high level. Thus, a number of studies have been made hitherto for increasing the yield of olefin polymers per catalyst component. In case the yield of olefin polymers per titanium atom is low, the titanium component remaining in the resultant polymers having a strong corrosive action not only causes serious damage of the polymerization apparatus or various devices used in the after-treatment but also gives bad influence on the resultant polymer itself, such as deterioration of its quality or yellowing of the polymer. Hence, there was a strong demand in this art to solve such problems. Although studies have been made to solve the problems by minimizing the titanium content in the catalyst component or by increasing the yield of polymers per unit weight of the catalyst component, a satisfactory result has not yet been obtained for both of the above means. In the majority of cases, a deashing step was needed in the prior arts to eliminate the residual titanium component. As the deashing step requires a large amount of an alcohol or a chelating agent, facilities for recovering or regenerating the alcohol or chelating agent are necessary, thus creating many incidental problems in aspects of resource, energy and the like factors. These were important problems to be solved in carrying out the process for polymerization of olefins in a commercial scale. In recent years, a variety of proposals have been presented to overcome the above mentioned problems. In general, the yield of olefin polymers will be decreased if the titanium content in the catalyst component is suppressed. On the other hand, the titanium content in the catalyst component will become higher if an increased yield of olefin polymer per unit weight of the catalyst component is desired. Thus, it is the current status that any of the proposals cannot overcome the problem that the yield of olefin polymers per titanium atom is low.

In Japanese Patent Publn. No. Sho. 56-52041, for example, there is proposed that a magnesium halide is contacted with an anhydrous compound of an element belonging to Group I, II, III or IV of the Periodic Table to decrease the titanium content in the catalyst component thereby enhancing the activity per titanium. In this prior art, however, the polymerization activity per catalyst component is extremely low, and as the result, the polymerization activity per titanium cannot be said to be satisfactory. In Japanese Patent Kokai No. 62-158704 previously proposed by a part of the present inventors wherein a catalyst component is prepared by bringing a product obtained by suspending a dialkoxymagnesium such as diethoxymagnesium in an aromatic hydrocarbon and contacting the suspension with a titanium halide into further contact with a titanium halide in such manner that a diester of an aromatic dicarboxylic acid is allowed to coexist at any step in the procedure, the polymerization activity per catalyst component can remarkably be enhanced. As the titanium content in the catalyst component is higher in this case, however, the polymerization activity per titanium atom fails to show a fully satisfactory value.

As the amount of an expensive organoaluminum compound used at the time of polymerization is defined in many cases by an Al/Ti molar ratio, a higher titanium content in the catalyst component substantially means the use of a large amount of the organoaluminum compound, thus causing an increase in a unit price of the catalyst in terms of a total catalyst including the organoaluminum compound even if the catalytic activity shows a high value of a certain degree.

Under the circumstances, there is a great demand in this art to develop a new type solid catalyst component which overcomes the problems seen in the prior art catalyst components and can increase the yield of stereospecific olefin polymers per catalyst component.

BRIEF SUMMARY OF THE INVENTION

Accordingly, it is an object of the present invention to provide a new solid catalyst component having an extremely low titanium content.

It is another object of the present invention to provide a solid catalyst component capable of exhibiting, when applied to the polymerization of olefins, an extremely high polymerization activity combined with a high stereospecific performance.

It is still another object of the present invention to provide a solid catalyst component capable of maintaining enhanced polymerization activity per titanium atom for an extended period of time.

It is further object of the present invention to provide a solid catalyst component which does not necessitate any deashing treatment and affords remarkable economical advantages.

Other and further objects, features and advantages of the present invention will be apparent more fully from the following description.

DETAILED DESCRIPTION OF THE INVENTION

Taking the above mentioned circumstances into consideration, the present inventors have made extensive researches for developing a new solid catalyst component for olefin polymerization catalysts, which overcomes the various drawbacks seen in the prior art catalyst components and enables the production of stereospecific polymers in a higher yield per titanium atom contained in the catalyst component. As a result of such extensive researches, it has now been found surprisingly that a solid catalyst component derived from diethoxymagnesium, titanium tetrachloride, a diester of an aromatic carboxylic acid, calcium chloride and a specific silicon compound according to specific treatments conducted in a special order of succession under specific conditions has a remarkably high polymerization activity per titanium atom combined with stereospecific performance and scarcely incurs problems of corrosion of apparatus and deterioration in quality of the resultant polymer. The present invention has been accomplished on the basis of the above findig.

In accordance with the present invention, there is provided a solid catalyst component for olefin polymerization catalysts prepared by subjecting diethoxymagnesium (a), calcium chloride (b) and a silicon compound (c) of the general formula: Si(OR)$_4$ (wherein R is an alkyl or aryl group) together to a contact treatment in the presence of an organic solvent (d), suspending the treated composition in an aromatic hydrocarbon (e) which is liquid at normal temperature and bringing the suspension into a first contact with titanium tetrachloride (f) to form a product and bringing it into a second contact with titanium tetrachloride (f) in such manner that a diester (g) of an aromatic dicarboxylic acid is allowed to coexist at any stage of the above suspending and/or contacts with the exception of the contact treatment, the calcium chloride (b) being used in an amount of 1-2 g per gram of the diethoxymagnesium (a).

The solid catalyst component of the present invention has various features as compared with the prior art solid catalyst components showing inferior polymerization activity per titanium atom contained therein. One of the features of this invention resides in the use of a combination of specific sorts of ingredients with specific conditions. In the solid catalyst component of this invention, diethoxymagnesium, titanium tetrachloride, an aromatic hydrocarbon, calcium chloride a specific silicon compound, and a diester of an aromatic carboxylic acid are used as constituents for the catalyst component under specific conditions, i.e. specific treatments in a special order of succession. Another feature resides in the mode of contact with titanium tetrachloride; in the course of preparing the solid catalyst component, titanium tetrachloride is brought into contact twice with the other ingredients. The polymerization activity of the catalyst component can remarkably be enhanced by such special contact mode.

The silicon compound (c) of the general formula: Si(OR)$_4$ wherein R is an alkyl or aryl group [referred to hereinafter simply as the substance (c)] preferably has 1-4 carbon atoms in the alkyl moiety and a phenyl or a $C_1$-$C_4$ alkyl-phenyl as the aryl group. Illustrative of the substance (c) are, for example, tetramethoxysilane, tetraethoxysilane, tetrapropoxysilane, tetraphenoxysilane and tetra(methylphenoxy)silane. The use of tetraethoxysilane is preferable as the substance (c).

The organic solvent (d) [referred to hereinafter simply as the substance (d)] may be of an aliphatic or aromatic nature so far as it is liquid at normal temperature. Usually, n-hexane or n-heptane which is easily commercially available can advantageously be employed.

The aromatic hydrocarbon (e) which is liquid at normal temperature [referred to hereinafter simply as the substance (e)] is selected from benzene and alkylbenzenes having 1-3 alkyl groups each with 1-4 carbon atoms. Examples of the alkylbenzenes include toluene, xylene, trimethylbenzene and ethylbenzene. The use of toluene is preferable in the present invention. Besides these aromatic hydrocarbons (e), halogenated hydrocarbons such as 1,2-dichloroethane and o-dichlorobenzene can also be used equivalently as the substance (e).

The diester (g) of an aromatic carboxylic acid [referred to hereinafter simply as the substance (g)] is usually selected from dialkyl esters of phenylenedicarboxylic acids. The two alkyl moieties may be the same or different and each with 1-8 carbon atoms. The phenylenedicarboxylic acid is preferably phthalic acid or terephthalic acid. Illustrative of the preferable substance (g) are, for example, dimethyl phthalate, diethyl phthalate, dipropyl phthalate, diisopropyl phthalate, dibutyl phthalate, diisobutyl phthalate, diamyl phthalate, diisoamyl phthalate, methyl ethyl phthalate, methyl propyl phthalate, methyl butyl phthalate, methyl isobutyl phthalate, ethyl propyl phthalate, ethyl butyl phthalate, ethyl isobutyl phthalate, propyl butyl phthalate, propyl isobutyl phthalate, propyl amyl phthalate, butyl amyl phthalate, dimethyl terephthalate diethyl terephthalate, dipropyl terephthalate, diisopropyl terephthalate, dibutyl terephthalate, diisobutyl terephthalate, diamyl terephthalate, diisoamyl terephthalate, methyl ethyl terephthalate, methyl propyl terephthalate, methyl butyl terephthalate, methylisobutyl terephthalate, ethyl propyl terephthalate, ethyl butyl terephthalate, ethyl isobutyl terephthalate, propyl butyl terephthalate, propyl isobutyl terephthalate, propyl amyl terephthalate and butyl amyl terephthalate. Among these diesters, lower ($C_1$-$C_4$) dialkyl diesters wherein the alkyl groups are identical with each other are most preferable, such as diethyl phthalate, dipropyl phthalate, dibutyl phthalate, diisobutyl phthalate, diamyl phthalate, diethyl terephthalate, dipropyl terephthalate, dibutyl terephthalate, diisobutyl terephthalate and diamyl terephthalate.

The diethoxymagnesium (a), [referred to hereinafter simply as the substance (a)] calcium chloride (b) [referred to hereinafter simply as the substance (b)] and titanium tetrachloride (f) [referred to hereinafter simply as the substance (f)] are all commercially available or may be prepared according to the process known per se.

In this invention, the substance (b) is used in an amount of 1-2 g per gram of the substance (a). As to the other substances, no particular limitation exists in their proportion so far as it gives no bad influence on the quality of the resultant solid catalyst component. Usually, however, the substance (c) is used in an amount within the range of 0.1-10 m-mol, preferably 0.5-3 m-mol per gram of the total amount of the ubstance (a) and the substance (b). The amount of the substance (f) is used in an amount of at least 1 g, preferably at least 2 g per gram of the substance (a) at the time of the first contact with the treated composition. The substance (e) is used in any suitable amount so far as the amount is sufficient enough to form a suspension with the treated composition. Similarly, the substance (g) is used in an amount within the range of 0.05-10 m-mol, preferably 0.2-5 m-mol per gram of the total amount of the substance (a) and the substance (b).

The amount of the substance (f) used for the second contact is at least 1 g, preferably at least 2 g per gram of the substance (a), as in the case of the first contact.

A complicate limitation exists in the order of contact of the individual ingredients. Thus, there are some preferable modes for preparing the solid catalyst components in connection with the order of contact of the individual ingredients. According to the first mode, the substance (a) and the substance (b) are copulverized by the aid of a vibrating mill, a ball mill, a column grinder or the like means. The copulverization ofthe substance (a) and the substance (b) is effected with a period from 5 minutes to 100 hours, preferably from 5 minutes to 10 hours. The resultant copulverized composition is subjected to a contact treatment with the substance (c) in the presence of the substance (d) and then contacted with the substances (e) and (f) in the presence of the substance (g). The product thus obtained is then brought into further contact with the substance (f). According to the second mode, the substance (a) and the substance (b) are contacted with each other in the presence of the substance (d) and the mixture is then subjected to a contact treatment with the substance (c). The resultant composition is contacted with the substance (e) and the substance (f) in the presence of the substance (g). The product thus obtained is further contacted with the substance (f).

It is an indispensable condition in the present invention that the substance (a), the substance (b) and the substance (c) have to be contacted with one another in the presence of the substance (d). The temperature in this case is usually within the range of 0°–100° C. and the time for the contact is within a period of 5 minutes to 100 hours, preferably from 5 minutes to 10 hours. The substance (d) is used in an amount sufficient enough to make a mixture of the substances (a), (b) and (c) liquid or slurried. After the contact treatment, the composition may repeatedly be washed with an organic solvent, if necessary. The composition is then brought into the first contact with the substance (f) in the presence of the substance (e). The temperature during this first contact is within the range of 50°–136° C, preferably 80°–136° C. The time for this first contact is within a period from 5 minutes to 100 hours, preferably from 5 minutes to 10 hours. After this first contact, the resultant product may be washed repeatedly with the substance (e) or other inert organic solvents, if necessary, and then successively brought into the second contact with the substance (f). This second contact is carried out under the same conditions as in the first contact, e.g. at a temperature of 50°–136° C., preferably 80°–136° C. and within a period from 5 minutes to 100 hours, preferably from 5 minutes to 10 hours. The substance (e) can be used singly or as a mixture or, if desired, together with other inert organic solvents. The solid catalyst component thus obtained may be washed, if necessary, with an inert organic solvent such as n-heptane. A series of these operations in the preparation of the solid catalyst component are usually carried out in the absence of air and moisture to prevent any deterioration of the quality of the resultant solid catalyst component.

The solid catalyst component of this invention is used as such for the preparation of an olefin polymerization catalyst or may be stored in dry state, in wet state or in an inert medium for a prolonged period of time without any reduction in its performance.

In the preparation of an olefin polymerization catalyst, the solid catalyst component is combined with an organoaluminum compound such as triethylaluminum. On the use of such olefin polymerization catalyst for polymerizing olefins, it is preferable to use an electron donor, for example, an organosilicon compound such as phenyltriethoxysilane jointly with the catalyst. A polymerization reaction of olefins can be carried out in the presence or absence of an organic solvent. An olefin monomer can be used for this reaction either in gaseous or liquid state. Thus, the term "polymerization" merely used herein means any type of the polymerizations including homopolymerization and copolymerization of olefins as well as any mode of the polymerization including gas or bulk polymerization in the absence of any polymerization solvent and slurry or solution polymerization where a polymerization solvent is used. The polymerization temperature is below 200° C., preferably below 100° C. and the polymerization pressure is below 100 kg/cm$^2$.G, preferably below 50 kg/cm$^2$.G.

Olefins utilizable for the polymerization or copolymerization wherein the solid catalyst of this invention is used are $C_2$-$C^4$ α-olefins and involve ethylene, propylene and butene-1.

In case the polymerization of olefin is carried out by using a catalyst derived from the solid catalyst component of this invention, the yield of olefin polymers per solid catalyst component, or in ther words, the polymerization activity per solid catalyst component is remarkably high notwithstanding the titanium content (titanium carrier ratio) in the solid catalyst component is extremely low, and as the result, the residual titanium content in the resultant polymer is so negligible that any deashing treatment is scarecely necessary and there arises no problem of deterioration and yellowing of the resultant polymer.

In many cases, the molar ratio of Al in an organoaluminum compound to Ti in the solid catalyst component, i.e. Al/Ti molar ratio, is usually fixed within a certain range in the polymerization of olefins. In such case, the yield of olefin polymers per catalyst component is remarkably high without varying the Al/Ti molar ratio notwithstanding the titanium content in the solid catalyst component is extremely low. Consequently, the amount of an organoaluminum compound to be used together can be decreased to reduce cost of the total catalyst.

In case the polymerization of olefins is carried out by the aid of a catalyst derived from the solid catalyst component of this invention, reduction in the polymerization activity with the lapse of time is extremely low.

Further, a catalyst derived from the solid catalyst component of this invention achieves n additional merit that its catalytic activity and stereospecific performance are scarcely deteriorated in case of performing the polymerization of olefins in the coexistence of hydrogen.

The present invention will now be illustrated in more detail by way of Examples and Comparative Example.

EXAMPLE 1

(1) Preparation of the Solid Catalyst Component

In a 1.2 liter vibrating mill pot charged up to 3/5 of the whole capacity with stainless steel balls of 25 mm in diameter, the air in which had been substituted sufficiently with nitrogen, were placed 45 g of calcium chloride and 45 g of diethoxymagnesium. The mixture was subjected to a co-grinding treatment operated for 5 hours at room temperature at a vibration number of 1430 V.p.m. and an amplitude of 3.5 mm. In a 500 ml round-bottomed flask equipped with a stirrer, the air in which had been substituted sufficiently with nitrogen, were placed 9 g of the composition obtained by the preceding pulverization treatment, 1.9 g of tetraethoxysilane and 75 ml of n-heptane. The mixture was stirred for 2 hours at 80° C. The mixture was washed with n-heptane and the resultant supernatant was removed. To the mixture was added 50 ml of toluene. The obtained mixture was stirred for 5 minutes. To the mixture was added 50 ml of $TiCl_4$, and the mixture was heated up to 90° C. After adding 1.9 g of n-dibutyl phthalate, the mixture was heated up to 115° C and reacted together for 2 hours under agitation. The resultant solid product was collected by filtration and washed with 100 ml of fresh toluene at 90° C. To the solid product were then added 40 ml of TiCl4 and 60 ml of toluene, and the mixture was reacted together for 2 hours at 115° C. with stirring. After completion of the reaction, the reaction mixture was cooled down to 40° C. and washed repeatedly with n-heptane. The washing treatment was finished at the time chlorine was no longer detected in the washings, whereby a solid catalyst component was obtained. By the way, a solid matter and a liquid in the solid catalyst component were separated and the solid matter was subjected to elementary analysis whereupon the contents in terms of % by weight were as follows: Ca 16.7, Mg 9.9, Cl 61.0 and Ti 1.24.

(2) Polymerization

In a 2.0 liter autoclave equipped with a stirrer, the air in which had been replaced entirely by nitrogen, were placed 700 ml of n-heptane. The autoclave was charged successively with 181 mg of triethylaluminum, 38 mg of phenyltriethoxysilane and the solid catalyst component in an amount of 0.3 mg in terms of titanium, while maintaining the nitrogen atxosphere. Into the autoclave was then charged 120 ml of hydrogen and the mixture was heated to 70° C. Gaseous propylene was introduced into the autoclave and subjected to polymerization reaction for 2 hours while maintaining the pressure at 6 kg/cm²G.

After the polymerization reaction, the resultant solid polymer was collected by filtration and warmed at 80° C. under reduced pressure for drying. On the other hand, the filtrate was concentrated to obtain a polymer having been dissolved in the polymerization solvent. The solid polymer was extracted with boiling n-heptane for 6 hours to obtain a polymer insoluble in n-heptane. Designating the amount of the polymer dissolved in the polymerization solvent as (A), the amount of the solid polymer as (B) and the amount of the polymer insoluble in n-heptane as (C), the polymerization activity (D) per Ti of solid catalyst component can be calculated according to the following formula:

$$(D) = \frac{[(A) + (B)] \,(g)}{\text{Amount of Ti of the solid catalyst component (mg)}}.$$

the yield of Ti of the solid catalyst componet (mg). according to the following formula:

$$(E) = \frac{(C)}{(B)} \times 100(\%).$$

The yield (F) of the total crystalline polymer is calculated according to the following formula:

$$(F) = \frac{(C)}{(A) + (B)} \times 100(\%).$$

A result of the polymerization is shown in Table 1 wherein the melt index of the resultant polymer is designated as (G).

EXAMPLE 2

The preparation of a solid catalyst component was carried out in the same manner as illustrated in Example 1 except that the amount of tetraethoxysilane was 2.5 g. By the way, a solid matter and a liquid in the resultant solid catalyst component were separated and the solid matter was subjected to elementary analysis whereupon the contents in terms of % by weight were as follows: Ca 16.7, Mg 9.7, Cl 61.4 and Ti 1.18.

As experiment for polymerization was carried out in the same manner as described in Example 1. A result of the experiment is shown in Table 1.

EXAMPLE 3

An experiment for polymerization was carried out in the same manner as described in Example 1 except that 39 mg of diphenyldimethoxysilane was used in place of phenyltriethoxysilane. A result of the experiment is shown in Table 1.

EXAMPLE 4

(1) Preparation of a Solid Catalyst Component

In a 500 ml round-bottomed flask equipped with a stirrer, the air in which had been substituted sufficiently with nitrogen, were placed 4.5 g of calcium chloride, 4.5 g of diethoxymagnesium and 75 ml of n-heptane. To the mixture was added 1.9 g of tetraethoxysilane, and the components were contacte'd together for 2 hours at 80° C. under agitation. The mixture was washed with n-heptane and the resultant supernatant was removed. To the obtained mixture was added 50 ml of toluene and 50 ml of TiCl4, and the mixture was heated up to 90° C. After adding 1.9 g of n-butyl phthalate, the mixture was further heated up to 115° C. and reacted for 2 hours under agitation. The resultant solid product was collected by filtration and washed with 100 ml of fresh toluene at 90° C. To the solid product were then added 40 ml of TiCl4 and 60 ml of toluene, and the mixture was reacted together for 2 hours at 115° C. with stirring. After completion of the reaction, the mixture was cooled down to 40° C. and washed repeatedly with n-heptane. The washing treatment was finished at the time chlorine was no longer detected in the washings, whereby a solid catalyst component was obtained. By the way, a solid matter and a liquid in the solid catalyst component were separated and the solid matter was subjected to elementary analysis whereupon the contents in terms of % by weight were as follows: Ca 17.0, Mg 9.8, Cl 60.6 and Ti 1.20.

(2) Polymerization

An experiment for polymerization was carried out in the same manner as described in Example 1. A result of the experiment is shown in Table 1.

COMPARATIVE EXAMPLE 1

An experiment was carried out in the same manner as illustrated in Example 4 except that calcium chloride was not used but 9 g of diethoxymagnesium and 2.5 g of n-dibutyl phthalate were used at the time of preparing the solid catalyst component. In this case, a solid matter and a liquid in the solid catalyst component were separated and the solid matter was subjected to elementary analysis whereupon the contents in terms of % by weight as follows: Mg 18, Cl 62 and Ti 3.12.

On polymerization of propylene, an experiment was carried out in the same manner as illustrated in Example 1 except that 0.5 mg of the solid catalyst component in terms of titanium atom, 301 mg of triethylaluminum and 64 mg of phenyltriethoxysilane were used. A result of the experiment is shown in Table 1.

COMPARATIVE EXAMPLE 2

(1) Preparation of the Solid Catalyst Component

In a 1.0 liter vibrating mill pot charged up to 3/5 of the whole capacity with stainless steel balls of 25 mm$\phi$ were placed 5 g of anhydrous $MgCl_2$, 40 g of anhydrous LiCl and 5.4 g of $TiCl_4$ in nitrogen atmosphere. The mixture was subjected to a pulverizing treatment for 16 hours at a vibration number of 1460 v.p.m. and an amplitude of 3.5 mm.

In a 500 ml round-bottomed flask equipped with a stirrer, the air in which had been substituted sufficiently with nitrogen, were placed 5 g of the above pulverized product suspended in 120 ml of anhydrous n-heptane and 0.84 g of N,N',N'', N'''-tetramethylethylenediamine. The mixture was allowed to stand for 45 minutes at room temperature with stirring. The mixture was then diluted with 300 ml of n-heptane to form a catalyst component. A solid matter and a liquid in the catalyst component was separated and the solid matter was subjected to elementary analysis whereupon the Ti content therein was 1.02% by weight.

(2) Polymerization

An experiment was carried out in the same manner as illustrated in Example 1 except that 0.5 mg of the catalyst component in terms of Ti atom and 120 mg of triethylaluminum were used but phenyltriethoxysilane was not used. A result of the experiment is also shown in Table 1.

TABLE 1

|  | Examples | | | | Comparative Examples | |
|---|---|---|---|---|---|---|
|  | 1 | 2 | 3 | 4 | 1 | 2 |
| Amount of the polymer dissolved in the polymerization solvent (A) (g) | 3.1 | 2.9 | 3.3 | 3.0 | 3.1 | 4.5 |
| Amount of the solid polymer (B) (g) | 307 | 310 | 350 | 299 | 244 | 16.1 |
| Amount of the polymer insoluble in boiling n-heptane (C) (g) | 303 | 306 | 346 | 294 | 241 | 11.6 |
| Polymerization activity per Ti of solid catalyst component (D) | 1060 | 1040 | 1170 | 1000 | 490 | 41 |
| Yield of the crystalline polymer (E) (%) | 98.8 | 98.8 | 98.7 | 98.5 | 98.6 | 72.1 |
| Yield of the total crystalline polymer (F) (%) | 97.8 | 97.9 | 97.8 | 97.5 | 97.4 | 56.2 |
| MI of the resultant polymer (G) | 6.2 | 7.8 | 3.9 | 6.6 | 6.5 | 8.5 |

It is understood that the preceding representative examples may be varied within the scope of the present specification both as to reactants and reaction conditions, by one skilled in the art to achieve essentially the same results.

As many widely different embodiments of this invention may be made without departing from the spirit and scope thereof, it is to be construed that this invention is not limited to the specific embodiments thereof except as defined in the appended claims.

What is claimed is:

1. A solid catalyst component for olefin polymerization catalysts prepared by subjecting diethoxymagnesium, oalcium chloride and a silicon compond of the general formla: $Si(OR)_4$ wherein R is an alkyl or aryl group to an initial contact treatment in the presence of an organic solvent to form a treated composition; suspending said treated composition in an aromatic hydrocarbon which is a liquid at normal temperature to form a suspension; and bringing the suspension into a first contact with titanium tetrachloride to form a product and bringing said product into a second contact with titanium tetrachloride in such manner that a diester of an aromatic dicarboxylic acid is introduced at any stage of the above said suspending and/or contact stages with the exception of said initial contact treatment, said calcium chloride being used in an amount of 1-2 g per gram of said diethoxymagnesium.

2. The solid catalyst component according to claim 1, wherein diethoxymagnesium and the calcium chloride are copulverized to form a composition, subjecting the resultant copulverized composition to an initial contact treatment with the silicon compound in the presence of the organic solvent, suspending the treated composition in the aromatic hydrocarbon to form a suspension, and thereafter bringing said suspension into a first contact with said titanium tetrachloride to form a product, bringing said product into second contact with said titanium acid tetrachloride in such manner that said diester of an aromatic dicarboxylic is introduced during the above suspending and/or contact stages with the exception of said initial contact treatment.

3. The solid catalyst component according to claim 1, wherein a product obtained by mixing the diethoxymagnesium with the calcium chloride in the organic solvent, subjecting the mixture to contact treatment with the silicon compound, suspending the treated composition in the aromatic hydrocarbon, and bringing the suspension into a first contact with the titanium tetrachloride is brought into a second contact with the titanium tetrachloride in such manner than the diester is allowed to coexist during the above suspending and/or contacts with the exception of the contact treatment.

4. The solid catalyst component according to any one of claims 1, 2 or 3, wherein said aromatic hydrocarbon is benzene or an alkyl-benzene.

5. The solid catalyst component according to claim 4, wherein said aromatic hydrocarbon is toluene.

6. The solid catalyst component according to any one of claims 1, 2 or 3, wherien said diester is a diester of phthalic or terephthalic acid.

7. The solid catalyst component according to claim 6, wherein said diester is selected from the group consisting of dimethyl phthalate, dimethyl terephthalate, diethyl phthalate, diethyl terephthalate, dipropyl phthalate, dipropyl terephthalate, dibutyl phthalate, dibutyl terephthalate, diisobutyl phthalate, diamyl phthalate, diisoamyl phthalate, ethyl isobutyl phthalate and ethyl propyl phthalate.

8. The solid catalyst component according to any one of claims 1, 2, or 3, wherein said silicon compound is tetra($C_1$-$C_4$ alkoxy)silane and tetraphenoxysilane.

9. The solid catalyst component according to claim 8, wherein said silicon compound is tetraethoxysilane.

10. The solid catalyst component according to any one of claims 1, 2, or 3, wherein said organic solvent is selected from aromatic and aliphatic hydrocarbons which are liquid at normal temperature.

11. The solid catalyst component according to claim 11, wherein said organic solvent is n-heptane or n-hexane.

12. The solid catalyst component according to any one of claims 1, 2 or 3, wherein the silicon compound is used in an amount of 0.1–10 m-mol per gram of the total amount of the diethoxymagnesium and the calcium chloride.

13. The solid catalyst component according to claim 12, wherein said silicon compound is used in an amount of 0.5–3 m-mol per gram of the total amount of said diethoxymagnesium and said calcium chloride.

14. The solid catalyst component according to any one of claims 1, 2 or 3, wherein the proportion of said titanium tetrachloride to said diethoxymagnesium alone or in combination with said calcium chloride at the time of said first or second contact is such that said titanium tetrachloride is used in an amount of at least 1 g per gram of said diethoxymagnesium.

15. The solid catalyst component according to claim 14, wherein the proportion of said titanium tetrachloride to said diethoxymagnesium alone or in combination with said calcium chloride at the time of said first or second contact is such that said titanium tetrachloride is used in an amount of at least 2 g per gram of said diethxoymagnesium.

16. The solid catalyst component according to any one of claims 1, 2 or 3, wherein said aromatic hydrocarbon is used in an amount sufficient to form a suspension of said diethoxymagnesium or a suspension of said diethoxymagnesium and said calcium chloride.

17. The solid catalyst component according to any one of claims 1, 2 and 3, wherein said diester is used in an amount of 0.05–10 m-mol per gram of the total amount of said diethoxymagnesium and said calcium chloride.

18. The solid catalyst component according to claim 17, wherein said diester is used in an amount of 0.2–5 m-mol per gram of the total amount of said diethoxymagnesium and said calcium chloride.

19. The solid catalyst component according to claim 2, wherein said copulverization is effected by a vibration mill, ball mill or column grinder.

20. The solid catalyst component according to claim 19, wherein said copulverization is effected within a period from 5 minutes to 100 hours.

21. The solid catalyst component according to claim 20, wherein said copulverization is effected within a period from 5 minutes to 10 hours.

22. The solid catalyst component according to claim 11, wherein the temperature during the said first or second contact is within the range of 50°–136° C.

23. The solid catalyst component according to claim 22, wherein said temperature during said first or second contact is within the range of 80°–136° C.

24. The solid catalyst component according to claim 11, wherein the time for said first or second contact is within a period from 5 minutes to 100 hours.

25. The solid catalyst component according to claim 24, wherein said time for said first or second contact is witin a period from 5 minutes to 10 hours.

26. A solid catalyst component for olefin polymerization catalysts prepared by subjecting diethoxymagnesium, calcium chloride and a silicon compound of the general formula $Si(OR)_4$: wherein R is an alkyl or aryl group together in an initial contact treatment in the presence of an organic solvent, said calcium chloride being in an amount of 1–2 g per gram of said diethoxymagnesium; suspending the resultant treated composition in an aromatic hydrocarbon which is liquid at normal temperature to form a suspension; and bringing said suspension into a first contact with titanium tetarchloride, said first contact being within a period of from 5 minutes to 100 hour and at a temperature within the range of 50°–136° C., to form a product; and bringing said product into a second contact with titanium tetachloride, said titanium tetrachloride being present in an amount of at least 1 g, in such manner that a diester of an aromatic dicarboxylic acid in an amount of from 0.05–10 mmol is introduced at any stage of the above suspending and/or contact stages with the exception of said initial contact.

* * * * *